United States Patent
Farrell et al.

(10) Patent No.: US 6,527,207 B1
(45) Date of Patent: Mar. 4, 2003

(54) CUTTING DEVICE AND METHOD FOR CUTTING MATERIAL FROM A CONTAINER

(76) Inventors: James J. Farrell, 25 Van Tassel La., Orinda, CA (US) 94563; Steven T. Dorsey, 30842 Country Rd. 50, St. Joseph, MN (US) 56374

( * ) Notice: Subject to any disclaimer, the term of this patent is extended or adjusted under 35 U.S.C. 154(b) by 0 days.

(21) Appl. No.: 09/700,091
(22) PCT Filed: May 14, 1999
(86) PCT No.: PCT/US99/10924
§ 371 (c)(1),
(2), (4) Date: Nov. 10, 2000
(87) PCT Pub. No.: WO99/58304
PCT Pub. Date: Nov. 18, 1999

Related U.S. Application Data
(60) Provisional application No. 60/085,476, filed on May 14, 1998.

(51) Int. Cl.[7] ............................................. B02C 18/18
(52) U.S. Cl. ..................................... 241/23; 241/199.12
(58) Field of Search ...................... 241/30, 100, 199.12, 241/282.2, 290, 199.11, 282.1, 283, 205, 292.1, 23

(56) References Cited

U.S. PATENT DOCUMENTS

| | | | |
|---|---|---|---|
| 202,600 A | 4/1878 | Stein | |
| 216,607 A | 6/1879 | Dunbar | |
| 223,753 A | 1/1880 | Packer | |
| 496,674 A | 5/1893 | Urbach | |
| 856,295 A | * 6/1907 | Prindle | .................. 241/199.12 |
| 934,537 A | 9/1909 | Johnson | |
| 1,227,671 A | 5/1917 | Robertson | |
| 1,313,830 A | 8/1919 | Minsk | |
| 1,954,093 A | 4/1934 | Nelson | |
| 2,026,240 A | 12/1935 | Luxmore | |
| 2,072,691 A | 3/1937 | Stark | |
| 2,115,809 A | 5/1938 | Goldman | |
| 2,254,236 A | 9/1941 | Myers | |
| 2,288,063 A | 6/1942 | Ashlock, Jr. | |
| 2,667,423 A | 1/1954 | Simpson | |
| 2,701,131 A | 2/1955 | Love | |
| 2,898,091 A | 8/1959 | O'Neill, Jr. | |
| 2,941,885 A | 6/1960 | Tomlinson | |
| 2,967,433 A | 1/1961 | Phillips | |
| 3,154,123 A | 10/1964 | Tomlinson | |
| 3,156,278 A | * 11/1964 | Otto | ......................... 241/282.2 |
| 3,171,635 A | 3/1965 | Haentjens et al. | |
| 3,295,997 A | 1/1967 | Tomlinson et al. | |
| 3,503,757 A | 3/1970 | Rubenstein | |
| 3,514,080 A | 5/1970 | Price et al. | |
| 3,738,619 A | 6/1973 | Shirae | |
| 3,751,013 A | * 8/1973 | Schroeder | ................ 241/282.1 |
| 4,096,893 A | 6/1978 | Harvey, Jr. et al. | |
| 4,169,681 A | 10/1979 | Kato | |
| 4,358,298 A | 11/1982 | Ratcliff | |
| 4,544,277 A | 10/1985 | Schnellmann | |
| 4,547,076 A | 10/1985 | Maurer | |
| 4,708,487 A | 11/1987 | Marshall | |
| 4,872,764 A | 10/1989 | McClean | |
| 4,930,709 A | 6/1990 | Steffens | |

(List continued on next page.)

FOREIGN PATENT DOCUMENTS

| | | |
|---|---|---|
| DE | 2158002 | 11/1971 |
| FR | 981875 | 5/1951 |
| SU | 1122358 | 11/1984 |

*Primary Examiner*—Mark Rosenbaum
(74) *Attorney, Agent, or Firm*—Kinney & Lange, P.A.

(57) ABSTRACT

A cutting device for use in cutting through material in a container includes a rotatable shaft and a cutting element coupled to the shaft. The cutting element is laterally extendable and retractable relative to the shaft so as to accommodate tapered or non-cylindrical cups, as well as to allow use of the cutting elements in cups having different diameters.

33 Claims, 2 Drawing Sheets

U.S. PATENT DOCUMENTS

| | | |
|---|---|---|
| 4,946,287 A | 8/1990 | Barnard et al. |
| 5,150,967 A | 9/1992 | Neilson et al. |
| 5,328,263 A | 7/1994 | Neilson |
| 5,439,289 A | 8/1995 | Neilson |
| 5,580,007 A | 12/1996 | Caviezel et al. |
| 5,599,103 A | 2/1997 | Linscott |
| 5,803,377 A | 9/1998 | Farrell |
| 5,904,086 A * | 5/1999 | Figge et al. ............. 83/698.61 |
| 5,962,060 A | 10/1999 | Farrell |
| 6,041,961 A | 3/2000 | Farrell |
| 6,247,837 B1 | 6/2001 | Wardberg |

* cited by examiner

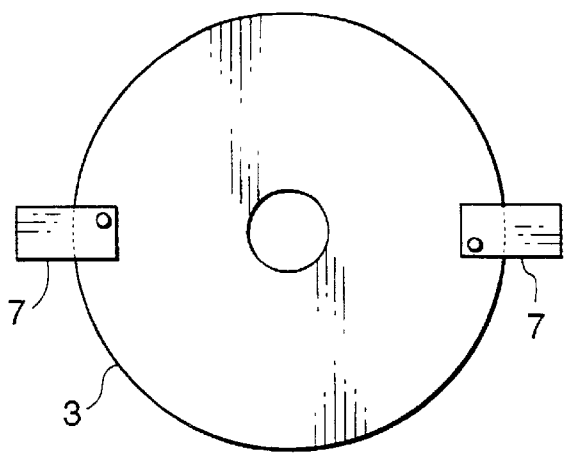
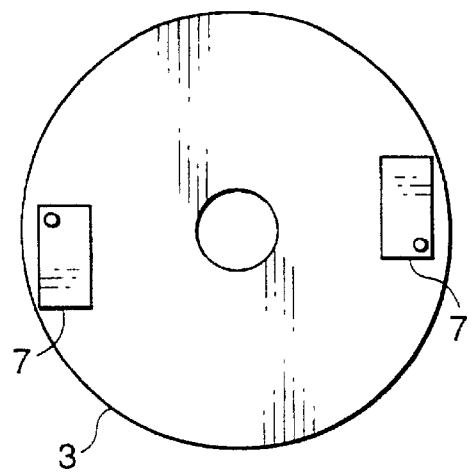
FIG. 5     FIG. 6
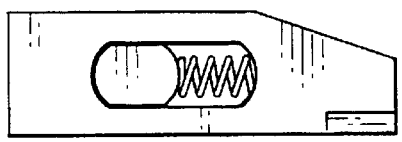
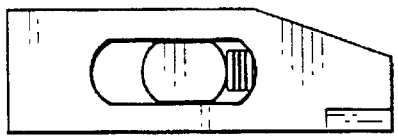
FIG. 7     FIG. 8
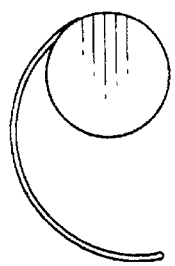
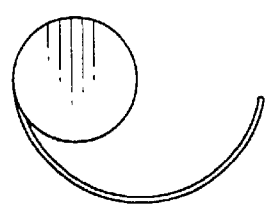
FIG. 9     FIG. 10
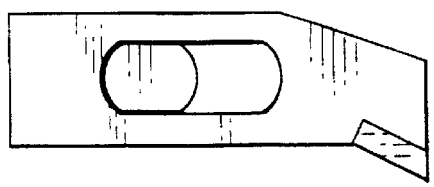
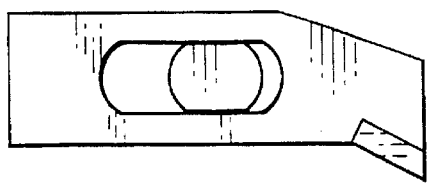
FIG. 11     FIG. 12

CUTTING DEVICE AND METHOD FOR CUTTING MATERIAL FROM A CONTAINER

This application claims the benefit of provisional application No. 60/085,476, filed May 14, 1998.

FIELD OF THE INVENTION

The present invention relates generally to the field of cutting devices. More particularly, the invention relates to the field of rotary blades used to cut through solid or semi-solid material contained in a non-cylindrical vessel.

BACKGROUND OF THE INVENTION

Preparation of certain foods and beverages can involve blending, whipping, stirring, etc. the food or beverage using a rotary blade or mixer which is lowered into a container holding the food or beverage.

In Applicant's Published International Application No. PCT/US97/08250 entitled APPARATUS AND METHOD FOR MAKING FROZEN DRINKS, the disclosure of which is incorporated herein by reference, a method for making frozen drinks is described. The application describes an apparatus which allows milkshakes and other frozen drinks to be quickly made by breaking up pre-frozen blocks of ingredients into small frozen particles using a rotating blade, and blending them with an added liquid also using the rotating blade. The ingredients to be frozen into frozen blocks are pre-mixed in liquid form, placed into serving cups which are the same serving cups in which the finished milkshake or frozen drinks are to be served, and then frozen into blocks conforming to the insides of the serving cups and stored.

According to the disclosure, when a milkshake or other frozen drink is to be made, a serving cup containing the frozen block is positioned in a cup holder which forms a part of the frozen drink machine. A rotating blade is lowered into the cup and bores through the frozen substance in the cup, grinding it into small frozen particles. As the blade moves towards the bottom interior of the cup, milk, water, or another liquid is added to the cup and is blended into the frozen substance by the rotating blade Beverage containers (also referred to herein as cups) of the type used in connection with the described frozen drink making process are often tapered or non-cylindrical in design. In many cases, the tops of the containers are wider than the bottoms of the containers, allowing the containers to be nested with one another for compact storage and transport.

Because the interior of a tapered cup is narrower at the bottom than it is at the top, a rotary blade used to bore through material in the cup must have a small enough diameter to fit into the bottom interior of the cup. As a result, the blade's diameter is significantly smaller than the diameter of the upper portions of the cup interior and thus does not reach solid material along the cup's sidewalls as it rotates within the cup. It is thus desirable to provide a boring device which will allow material in a tapered cup to be bored out to the cup's sidewalls, despite the tapered design of the cup.

SUMMARY OF THE INVENTION

The present invention is a cutting device for use in cutting through material in a container. The cutting device includes a rotatable shaft and a cutting element coupled to the shaft. The cutting element is laterally extendable and retractable relative to the shaft so as to accommodate tapered or non-cylindrical cups, as well as to allow use of the cutting elements in cups having different diameters.

BRIEF DESCRIPTION OF THE DRAWINGS

In FIG. 1 the blade 4 is in a laterally extended position to accommodate the wide diameter of the upper portion of the cup. In FIG. 2 the blade 4 is in a retracted position to accommodate the relatively narrower diameter of the lower portion of the cup.

FIG. 5 is a top plan view of a second embodiment of extendible/retractable cutting blades showing the blades in laterally extended positions relative to the rotatable cutting blade 3 to which they are pivotably attached.

FIG. 6 is a top plan view of the second embodiment of FIG. 5, illustrating the blades in a retracted position relative to the main cutting blade 3.

FIGS. 7 and 8 are top plan views of a third embodiment of a boring blade according to the present invention, positioned in an extended and a retracted position, respectively.

FIGS. 9 and 10 are top plan views of a fourth embodiment of a boring blade according to the present invention, positioned in an extended and a retracted position, respectively.

FIGS. 11 and 12 are top plan views of a third embodiment of a boring blade according to the present invention, positioned in an extended and a retracted position, respectively.

DETAILED DESCRIPTION OF THE DRAWINGS

The present invention is a cutting device which has the ability to cut through and loosen all of the material contained within a tapered or non-cylindrical walled vessel. The cutting device uses a retractable element which extends outward from its rotational axis until it contacts the inside wall of the vessel, at which point the further outward travel of the retractable element is prevented by the vessel wall. As the downward travel of the rotating cutting device proceeds in a tapered vessel, and the diameter of the tapered vessel decreases, the retractable element is forced back in toward the center axis of the cutting device. In this manner, the boring action of the cutting device conforms to the tapered shape of the vessel. The cutting device is further advantageous in that it may be used to bore or cut through material in a variety of different cups each of which has a different diameter or irregularly shaped cups, since the retractable/extendible blade will extend or retract as needed to accommodate each size or shape cup. It can be appreciated from this example that, while the cutting device is particularly desirable to use in tapered cups, its use is not limited to use in tapered cups.

The means of causing the retractable element to extend include numerous options. In one embodiment, centrifugal force generated by the spinning of the cutting device is used to force the element outward from its rotational axis. In another embodiment, the element can be forced outward by spring action. In yet another embodiment, the force generated by the element's contact with the material being bored may create an outward force. The commonality across these embodiments is that the wall of the container acts to constrain the outward travel of the element, resulting in a boring or cutting action which conforms to the shape of the vessel.

Figure 2:
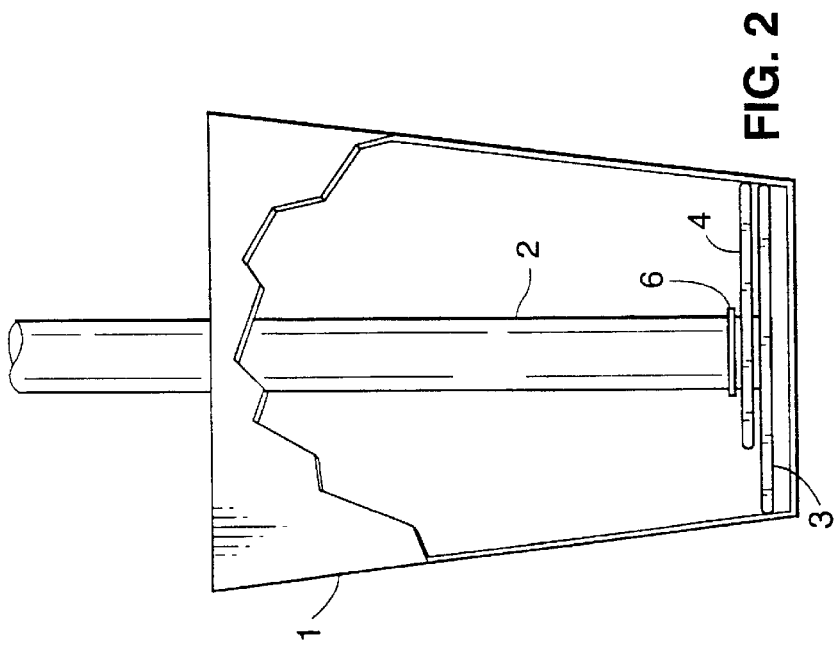
FIGS. 1 and 2 are side elevation views of containers illustrating use of a cutting blade embodying concepts of the present invention.
Figure 4:
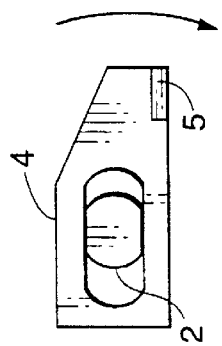
FIGS. 3 and 4 are top plan views of a first embodiment of a cutting blade, illustrating the position of the blade relative to the shaft when the blade is in the positions shown in FIGS. 1 and 2, respectively.
Figure 1:
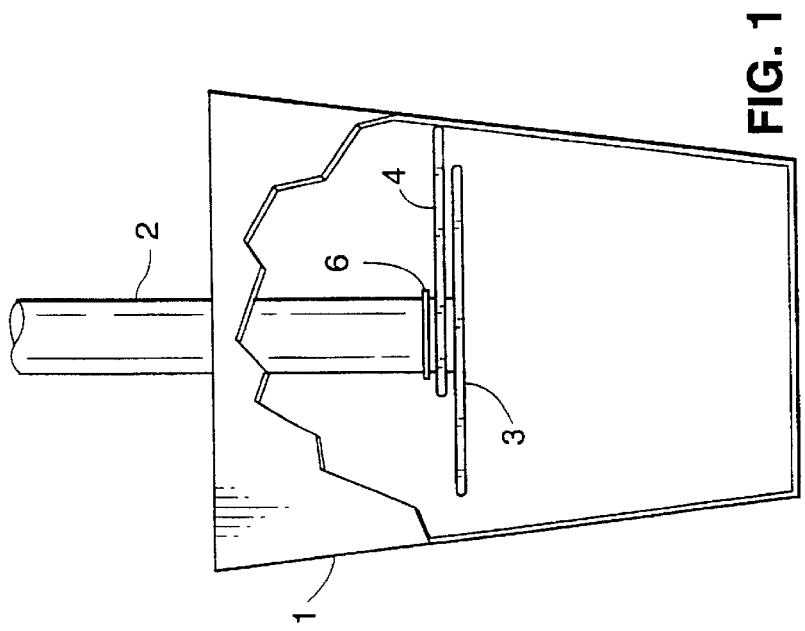
Figure 3:
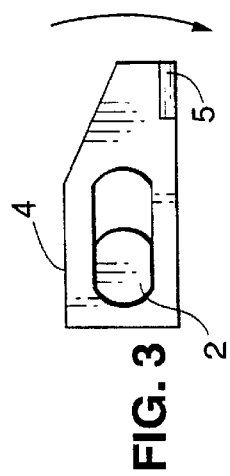

FIGS. 1 and 2 are side views of tapered vessels 1 with the cutting device at different vertical positions within the vessel. This embodiment shows a retractable cutting member 4 which is forced out by centrifugal force as the shaft 2 is rotated. The retractable cutting member 4 is held in position on the rotatable shaft by a retaining ring 6 above it as well as flats on shaft 2 which keep the cutting member from rotating relative to the shaft as the cutting member slides inward and outward. Blade 3 is a fixed blade on the shaft which bores a cylinder down through the center of the vessel. Product around the perimeter of the vessel which is not cut through by blade 3 is removed by the cutting edge 5 on retractable blade 4 as it rotates and moves downward. FIG. 3 shows retractable blade 4 in its more extended position which occurs near the top of the tapered vessel as depicted in FIG. 1. FIG. 4 shows the retractable blade 4 in its more retracted position, as caused by its contact with the vessel wall nearer to the bottom, as depicted in FIG. 2.

FIGS. 5 and 6 show an alternative embodiment of a centrifugally activated retractable cutter, where cutters are attached to a fixed cutting disc (such as the one shown and described in PCT/USA97/08250) such that they can rotate about a pivot point, allowing their extension beyond the outer edge of the fixed cutting disc in FIG. 5, or their retraction to within the cutting radius of the fixed cutting disc in FIG. 6.

FIGS. 7 and 8 show an alternative embodiment of a retractable cutter using a spring to force the element out. FIGS. 9 and 10 show another means of using a spring, where the entire member is a spring, and the outer portion of the spring also serves as the cutting edge. FIGS. 11 and 12 show a third embodiment where the shape and angle of the cutting edge create an outward force on the element as it bores down through the material in the tapered vessel.

Five embodiments of cutting devices have been described herein. It should be understood that these embodiments are described only by way of example and are not intended to limit the scope of the claims.

We claim:

1. A cutting device for cutting through material in a container, the cutting device comprising:
   a shaft rotatable about a shaft axis;
   a cutting element coupled to the shaft, at least a portion of the cutting element being transversely extendible and retractable relative to the shaft axis during rotation of the shaft; and
   a second blade carried by the shaft, the second blade being transversely fixed relative to the shaft axis.

2. The cutting device of claim 1 wherein the cutting element is transversely moveable relative to the shaft axis such that rotational movement of the shaft produces transverse extension of the cutting device by centrifugal force.

3. The cutting device of claim 1, wherein the cutting element includes a blade with a cutting surface oriented such that during rotation of the blade, contact between the blade and material to be cut results in extension forces on the cutting surface having a component in a transverse direction relative to the shaft axis which bias the cutting element outward toward further transverse extension from the shaft axis.

4. The cutting device of claim 1 wherein the second blade is spaced longitudinally from the cutting element.

5. The cutting device of claim 1, wherein the cutting element extends generally perpendicular relative to the shaft axis.

6. A cutting device for cutting through material in a container, the cutting device comprising:
   a shaft rotatable about a shaft axis;
   a cutting element coupled to the shaft, at least a portion of the cutting element being transversely extendible and retractable relative to the shaft axis during rotation of the shaft; and
   a spring configured to exert extension force on the cutting element in a transverse direction relative to the shaft axis, the extension force biasing the cutting element transversely outward toward further extension from the shaft axis.

7. A cutting device for cutting through material in a container, the cutting device comprising:
   a shaft rotatable about a shaft axis; and
   a cutting element coupled to the shaft, at least a portion of the cutting element being transversely extendible and retractable relative to the shaft axis during rotation of the shaft, wherein the cutting element is a spring member in contact with the material.

8. A cutting device for cutting through material in a container, the cutting device comprising:
   a rotatable shaft; and
   a cutting element coupled to the shaft, at least a portion of the cutting element being laterally extendible and retractable relative to the shaft during rotation of the shaft; wherein the retractable cutting element includes a slot and wherein the rotatable shaft extends through the slot, the rotatable shaft slidably supporting the cutting element for lateral extension and retraction.

9. The cutting device of claim 8, further providing a second blade carried by the shaft, the second blade being laterally fixed relative to the shaft.

10. A cutting system for providing cut material, the cutting system comprising:
    a container holding material to be cut;
    a cutting element rotatable about a rotational axis, the cutting element being advanceable relative to the container along its rotational axis for cutting through the material in the container;
    wherein at least a portion of the cutting element is at least one of transversely extendible and transversely retractable relative to the rotational axis during cutting rotation of the cutting element through the material in the container.

11. The cutting system of claim 10, wherein the cutting element is configured to retract in response to lateral inward contact by the container sidewall.

12. The cutting system of claim 10, wherein the container has a container sidewall which slopes relative to the rotational axis of the cutting element.

13. The cutting system of claim 12, wherein the container sidewall is frustoconical having a minimum diameter, and wherein the cutting element is laterally retractable at least to the minimum diameter and laterally extendable at least to a diameter larger than the minimum diameter.

14. The cutting system of claim 12, wherein the container sidewall is circular defining a container axis coincident with the rotational axis.

15. The cutting system of claim 10, wherein the container has a container sidewall, and wherein, prior to cutting, the material is nonrotatable relative to the container sidewall.

16. The cutting system of claim 15, wherein, prior to cutting, the material is solid.

17. A method of cutting through material located in a container, comprising the steps of:
    a. providing a rotatable shaft, a cutting element carried by the shaft, and a cup containing material to be cut through, the cup including a sidewall and a bottom;

b. rotating the shaft to cause rotation of the cutting element;

c. reducing distance between the cutting element and the bottom of the cup during rotation of the cutting element such that the cutting element rotationally cuts through material in the cup; and d. causing lateral extension or retraction of the cutting element to a position adjacent to the sidewall of the cup during rotational cutting.

18. The method of claim 17 wherein in step (d) the step of laterally extending the cutting element is carried out by centrifugal force resulting from the rotation of the cutting element.

19. The method of claim 17 wherein in step (d) the step of laterally retracting the cutting element is carried out by contact between the cup sidewall and the cutting element.

20. The method of claim 17 wherein step (a) also provides a spring contacting the cutting element, and wherein in step (d) the spring urges the cutting element laterally outwardly to perform the step of laterally extending the cutting element.

21. The method of claim 20 wherein the spring is in contact with the material to serve as the cutting element.

22. The method of claim 17 wherein the cutting element includes a blade with a cutting surface, wherein during steps (b) and (c) contact between the rotating cutting element and the material in the cup results in lateral extension forces on the cutting surface which bias the cutting element outward toward further extension from the shaft, and wherein in step (d) the step of laterally extending the cutting elements is accomplished using the lateral extension forces.

23. The method of claim 17, wherein the providing step further provides a second blade mounted on the shaft, the second blade being laterally fixed relative to the shaft, wherein rotation of the shaft in step (b) causes rotation of the second blade, wherein the method further includes the step of reducing distance between the second blade and the bottom of the cup and boring through material in the cup using the second blade.

24. The method of claim 23 wherein in step (a) the retractable cutting element is provided to be longitudinally spaced from the second blade.

25. The method of claim 17 wherein the cup provided in step (a) is a tapered cup and includes an interior bottom, and wherein step (d) includes gradually retracting the cutting element as the cutting element is moved towards the interior bottom, and gradually extending the cutting element as it is moved away from the interior bottom.

26. The method of claim 17, wherein the sidewall of the cup is circular defining a cup axis coincident with the shaft axis.

27. The method of claim 17, wherein, prior to cutting, the material is nonrotatable relative to the sidewall of the cup.

28. The method of claim 27, wherein, prior to cutting, the material is solid.

29. The method of claim 17, wherein the shaft rotates about a shaft axis, and wherein the cutting element extends generally perpendicular relative to the shaft axis.

30. A cutting device for cutting through material, the cutting device comprising:

a shaft rotatable about a shaft axis and having a leading end; and a leading cutting element fixedly coupled to the leading end of the shaft, the leading cutting element rotating with the shaft for cutting a predetermined diameter; and a trailing cutting element coupled to the shaft behind the leading cutting element;

wherein the trailing cutting element is at least one of transversely extendible and transversely retractable relative to the shaft axis during rotation of the shaft for cutting a varying diameter larger than the predetermined diameter.

31. A method of making an edible item comprising the acts of:

placing edible material in a container such that the edible material is a mass which is nonrotatable relative to a sidewall of the container, the sidewall defining a central axis of the container;

cutting the mass within the container by rotationally advancing a cutting element through the mass, the cutting element, during rotational cutting of the mass, extending transversely relative to the central axis of the container or retracting transversely relative to the central axis of the container to follow at least a portion of the sidewall of the container.

32. The method of claim 31 wherein the act of placing the edible material in the container comprises freezing the edible material within the container.

33. The method of claim 31 wherein at least a portion of the sidewall of the container constrains the cutting element and biases the cutting element inward causing retraction of the cutting element toward its rotational axis.

* * * * *

UNITED STATES PATENT AND TRADEMARK OFFICE
CERTIFICATE OF CORRECTION

PATENT NO. : 6,527,207 B1
DATED : March 4, 2003
INVENTOR(S) : James J. Farrell et al.

It is certified that error appears in the above-identified patent and that said Letters Patent is hereby corrected as shown below:

<u>Title page,</u>
Item [56], References Cited, U.S. PATENT DOCUMENTS, delete "2,898,091" and insert -- 2,898,094 --

Signed and Sealed this

Twenty-third Day of March, 2004

JON W. DUDAS
*Acting Director of the United States Patent and Trademark Office*